(12) United States Patent
Zhu et al.

(10) Patent No.: US 10,911,644 B2
(45) Date of Patent: Feb. 2, 2021

(54) DEVICE AND METHOD FOR IMPROVING IMAGE QUALITY

(71) Applicant: Huawei Technologies Co., Ltd., Guangdong (CN)

(72) Inventors: Liyu Zhu, Hangzhou (CN); Peng Xu, Hangzhou (CN); Binbin Zhou, Hangzhou (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 15 days.

(21) Appl. No.: 16/361,024

(22) Filed: Mar. 21, 2019

(65) Prior Publication Data

US 2019/0222722 A1 Jul. 18, 2019

Related U.S. Application Data

(63) Continuation of application No. PCT/CN2017/098303, filed on Aug. 21, 2017.

(30) Foreign Application Priority Data

Sep. 26, 2016 (CN) .......................... 2016 1 0851427

(51) Int. Cl.
*H04N 5/217* (2011.01)
*G06T 7/00* (2017.01)
(Continued)

(52) U.S. Cl.
CPC .............. *H04N 5/217* (2013.01); *G02B 13/16* (2013.01); *G02B 15/02* (2013.01); *G06T 5/009* (2013.01);
(Continued)

(58) Field of Classification Search
CPC ...... H04N 5/217; H04N 5/225; H04N 5/2254; H04N 5/228; H04N 5/232; H04N 5/23222;
(Continued)

(56) References Cited

U.S. PATENT DOCUMENTS 6,912,321 B2 * 6/2005 Gindele .................. G06T 5/007
348/226.1
10,157,451 B2 * 12/2018 Higashi ................ G06K 9/4604
(Continued)

FOREIGN PATENT DOCUMENTS

CN 103152548 A 6/2013
CN 104702920 A 6/2015
(Continued)

OTHER PUBLICATIONS

Jiao Shengyuan, "Analysis of Three Kinds of Fog Technology," Security knowledge network, Dec. 16, 2015, https:/m.asmag.com.cn/magazine/990.html, 11 pages.

*Primary Examiner* — Quan Pham
(74) *Attorney, Agent, or Firm* — Womble Bond Dickinson (US) LLP (57) ABSTRACT

This application provides an image processing method and an image collection device. A haze intensity of a first image is calculated. When the haze intensity of the first image is greater than a first threshold, control information is sent, where the control information is used to control a haze penetration optical component to move into a lens. Because the haze penetration optical component can improve quality of optical imaging, the lens into which the haze penetration optical component is moved has a function of optical haze penetration. It can be learned that, when the haze intensity of the first image is greater than the first threshold, the
(Continued)

function of the optical haze penetration is enabled, so as to improve quality of an image obtained in a haze environment.

9 Claims, 9 Drawing Sheets (51) Int. Cl.
    *G02B 15/02*     (2006.01)
    *H04N 5/228*     (2006.01)
    *H04N 5/225*     (2006.01)
    *H04N 5/232*     (2006.01)
    *G02B 13/16*     (2006.01)
    *G06T 5/00*     (2006.01)
    *G06T 7/40*     (2017.01)
    *H04N 5/238*     (2006.01)

(52) U.S. Cl.
    CPC .............. *G06T 7/0002* (2013.01); *G06T 7/40* (2013.01); *H04N 5/225* (2013.01); *H04N 5/228* (2013.01); *H04N 5/232* (2013.01); *H04N 5/238* (2013.01); *H04N 5/23222* (2013.01); *G06T 2207/20208* (2013.01); *G06T 2207/30168* (2013.01)

(58) Field of Classification Search
    CPC .... H04N 5/23229; G02B 13/16; G02B 15/02; G06T 5/009; G06T 7/0002; G06T 2207/20208; G06T 2207/30168
    See application file for complete search history.

(56) References Cited

U.S. PATENT DOCUMENTS

| | | | |
|---|---|---|---|
| 2008/0061950 A1* | 3/2008 | Kawasaki | G06K 9/00805 340/425.5 |
| 2008/0170754 A1 | 7/2008 | Kawasaki | |
| 2010/0171849 A1 | 7/2010 | Tohchi et al. | |
| 2011/0043603 A1 | 2/2011 | Schechner et al. | |
| 2015/0288871 A1 | 10/2015 | Saito et al. | |
| 2018/0352177 A1* | 12/2018 | Komiya | G06K 9/00771 |
| 2019/0215479 A1* | 7/2019 | Jeong | H04N 21/4223 |

FOREIGN PATENT DOCUMENTS

| | | |
|---|---|---|
| CN | 104732223 A | 6/2015 |
| CN | 104732700 A | 6/2015 |
| CN | 104766307 A | 7/2015 |
| CN | 105306875 A | 2/2016 |

* cited by examiner

DEVICE AND METHOD FOR IMPROVING IMAGE QUALITY

CROSS-REFERENCE TO RELATED APPLICATIONS

This application is a continuation of International Application No. PCT/CN2017/098303, filed on Aug. 21, 2017, which claims priority to Chinese Patent Application No. 201610851427.1, filed on Sep. 26, 2016. The disclosures of the aforementioned applications are hereby incorporated by reference in their entireties.

TECHNICAL FIELD

The present disclosure relates to the field of signal processing, and more specifically, to an image collection device and an image processing method.

BACKGROUND

A principle of an image collection device is to form an image by performing optical-to-electrical conversion on light emitted or reflected by a target object on an imaging component. When density of aerosols or solid particles in the atmosphere is relatively large, a series of effects such as blocking, scattering, and refraction are caused for a light beam in a propagation path. As a result, effective light that can enter a lens is reduced and degraded, and finally imaging quality is affected.

Therefore, quality of an image collected by the image collection device in haze weather is not high. For example, the following problems usually occur: a color is dim; a picture is blurred; contrast is relatively low; and a detail of an important target is easily submerged in a fog and cannot be perceived.

SUMMARY

In view of this, embodiments of the present disclosure provides an image collection device and an image processing method, so as to resolve a problem of image quality degradation caused by haze.

To resolve the foregoing technical problem, the following technical solutions are used in the present disclosure.

A first aspect of this application provides an image processing method, including: calculating a haze intensity of a first image; and when the haze intensity of the first image is greater than a first threshold, sending control information, where the control information is used to control a haze penetration optical component to move into a lens. The haze intensity is used to indicate a degree of impact of haze on definition of an image. Because the haze penetration optical component can improve quality of optical imaging, the lens into which the haze penetration optical component is moved has a function of optical haze penetration. It can be learned that, when the haze intensity of the first image is greater than the first threshold, the function of the optical haze penetration is enabled, so as to improve quality of an image obtained in a haze environment.

A second aspect of this application provides an image collection device, including a lens, a haze penetration optical component, an image signal processor, and a central processing unit. The haze penetration optical component is connected to the central processing unit by using a driving component. The image signal processor is configured to: calculate a haze intensity of a first image, and when the haze intensity of the first image is greater than a first threshold, send control information. The central processing unit is configured to control, based on the control information, the driving component to move the haze penetration optical component into the lens. The image collection device has a function of automatically enabling optical haze penetration.

In an implementation, the method further includes: obtaining a second image by using the lens into which the haze penetration optical component is moved; and when a haze intensity of the second image determined based on a ratio of an average value for atmospheric light of a plurality of sub-areas in the second image to actual atmospheric light is greater than a second threshold, performing contrast enhancement processing on the second image. In other words, when the function of the optical haze penetration is enabled, if the haze intensity of the image still does not meet a condition, a digital image processing algorithm is used to further process the image, so as to further improve quality of an image obtained in a haze environment.

In an implementation, a process of calculating the haze intensity of the second image specifically includes: setting a maximum RGB value in a target image as actual atmospheric light A; and using a ratio of an obtained average value for all Xs to the actual atmospheric light A as the haze intensity of the second image. A process of obtaining the target image and X includes: using the second image as an original current image and cyclically performing the following process until the target image is obtained, where the target image is a current image whose size is equal to or less than the preset size: dividing the current image into N sub-areas, for each sub-area, calculating a difference between a luminance average value of the sub-area and a luminance mean square error of the sub-area to obtain X, selecting a maximum value Xmax from Xs of the N sub-areas, and using a sub-area that obtains Xmax as the current image. Compared with a haze intensity obtained by using an existing dark channel algorithm, the method for determining the haze intensity based on the ratio of the average value for the atmospheric light of the plurality of the sub-areas in the second image to the actual atmospheric light can be applied to the image obtained by using the haze penetration optical component, and provide higher accuracy.

In an implementation, before the haze intensity of the first image is calculated, the method further includes: obtaining a third image by using a lens into which the haze penetration optical component is not moved; and when a haze intensity of the third image is greater than a third threshold, obtaining the first image by performing contrast enhancement processing on the third image. Before the optical haze penetration is enabled, contrast enhancement is first performed on the image. When an effect of the contrast enhancement is poor, the optical haze penetration is enabled. The haze penetration optical component is used to obtain only a greyscale image instead of a color image. Therefore, to ensure both definition and a color of the image, when the effect of the contrast enhancement processing is poor, the function of the optical haze penetration is enabled.

A third aspect of this application provides another image processing method, including: calculating a haze intensity of an image that is determined based on a ratio of an average value for atmospheric light of a plurality of sub-areas in the image to actual atmospheric light; and when the haze intensity of the image is not greater than a threshold, sending control information, where the control information is used to control a haze penetration optical component to move out of a lens, and a lens that the haze penetration optical component is not moved out of is used to obtain the image. It can be learned that when the haze intensity of the image is not greater than the threshold, a function of optical haze penetration is disabled, so as to obtain a color image.

A fourth aspect of this application provides an image collection device, including a lens, a haze penetration optical component, an image signal processor, and a central processing unit. The haze penetration optical component is connected to the central processing unit by using a driving component. The image signal processor is configured to: calculate a haze intensity of an image, and when the haze intensity of the image is not greater than a threshold, send control information. The central processing unit is configured to control, based on the control information, the driving component to move the haze penetration optical component out of the lens.

In an implementation, the method further includes: when the haze intensity of the image is greater than the threshold, performing contrast enhancement processing on the image.

In an implementation, the haze penetration optical component includes: a haze penetration lens or an optical filter.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely the embodiments of the present disclosure, and a person of ordinary skill in the art may derive other drawings from these accompanying drawings without creative efforts.

DESCRIPTION OF EMBODIMENTS

Embodiment of the present disclosure provides an image collection device. Specifically, the image collection device may be a part of a terminal, for example, may be an image collection unit disposed on a mobile phone. The image collection device may also be some independent devices, such as a video surveillance device.

An objective of this application is to reduce impact of a haze environment on image quality.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
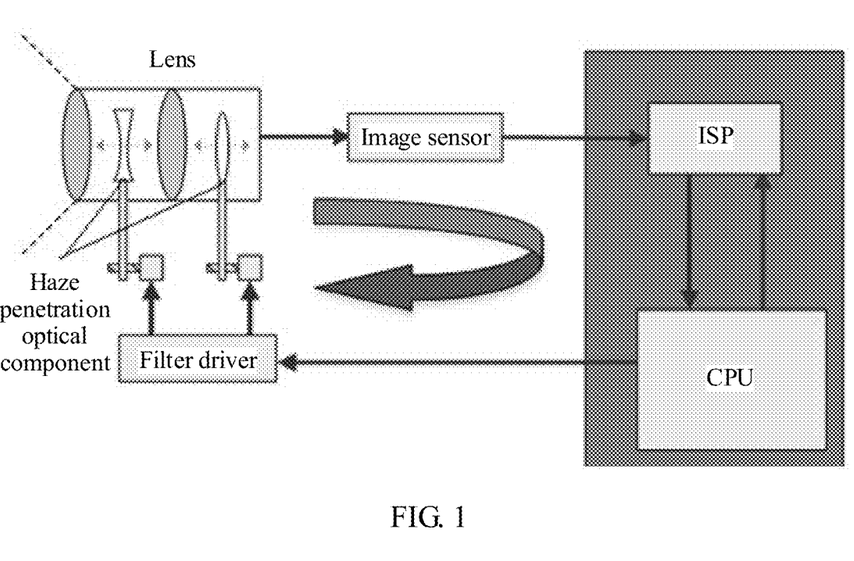
FIG. 1 is a schematic structural diagram of an image collection device according to an embodiment of this application.

FIG. 1 shows an image collection device provided in an embodiment of this application, including a lens, a haze penetration optical component, an image sensor, an image signal processor (ISP), and a central processing unit (CPU). The lens is configured to capture light emitted or reflected by a to-be-collected target, and the image sensor is configured to convert light into an image. The haze penetration optical component (including a haze penetration lens or an optical filter) is configured to change quality of optical imaging, so as to reduce impact of haze on quality of an image. The haze penetration optical component is connected to the central processing unit by using a driving component. The central processing unit controls, based on control information of the image signal processor, the driving component to move the haze penetration optical component into or out of the lens.

The image collection device shown in FIG. 1 performs, by using the haze penetration optical component, the image signal processor, and the central processing unit, haze penetration processing on the image formed by the image sensor. The haze penetration processing is reducing the impact of the haze on the quality of the image by using a technology, in other words, improving the quality of the image obtained under a haze condition.

For ease of description, in the embodiments of this application, the haze penetration processing is classified into the following types.

Optical haze penetration is changing the quality of the optical imaging by using the haze penetration optical component (including the haze penetration lens or the optical filter), so as to eliminate the impact of the haze on imaging and achieve an effect of haze penetration.

Digital haze penetration is performing contrast enhancement processing on the image formed by the image sensor, so as to enhance contrast of the image. For a digital haze penetration algorithm, refer to an existing contrast enhancement algorithm. For example, a local haze intensity of each pixel in a current image is calculated, and local contrast enhancement is performed based on the local haze intensity of each pixel.

In the embodiments of this application, the haze intensity is used to indicate the impact of the haze on definition of the image. A larger haze intensity indicates greater impact of the haze on the definition of the image, in other words, the image is dimmer due to the impact of the haze. A smaller haze intensity indicates less impact of the haze on the definition of the image.

Figure 2:
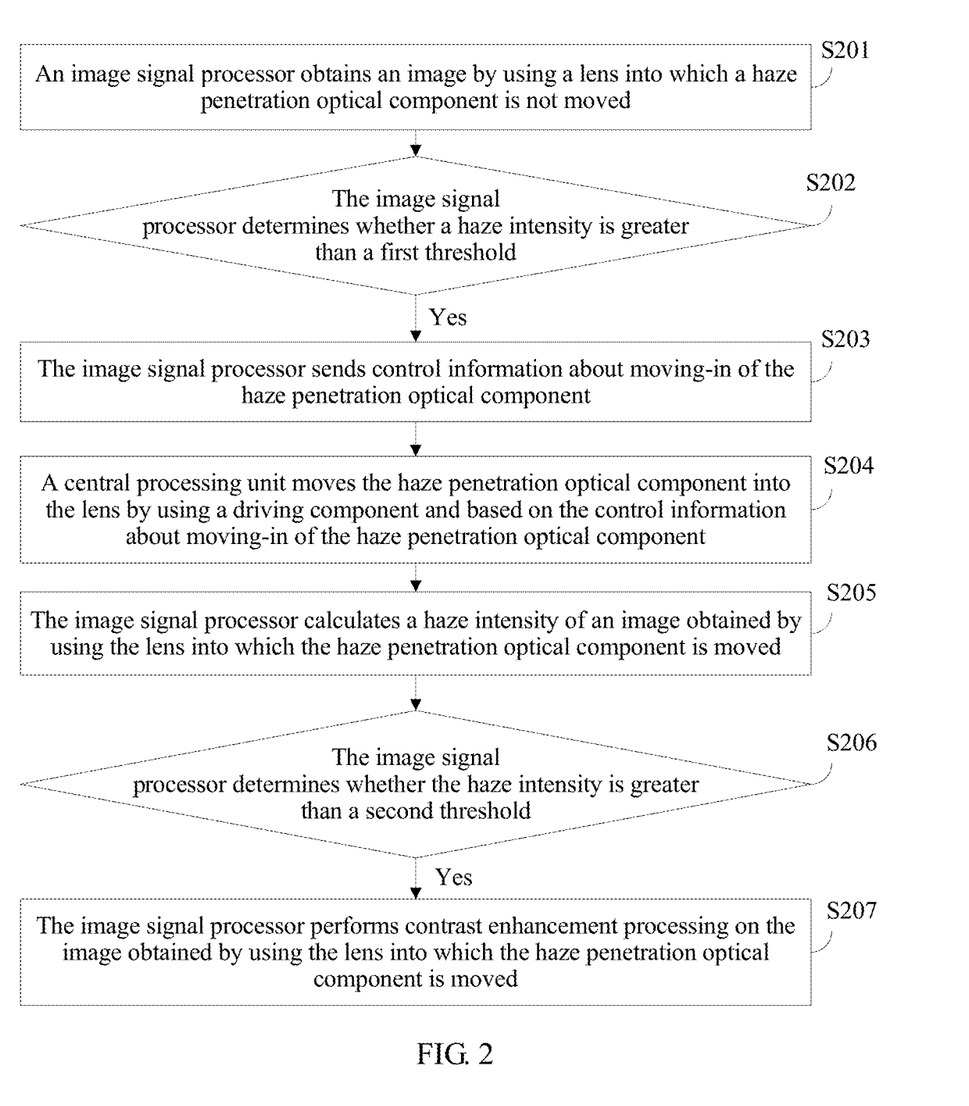
FIG. 2 is a flowchart of an image processing method according to an embodiment of this application.

FIG. 2 is a procedure of performing haze penetration processing by an image collection device. The procedure includes the following steps.

Step S201. An image signal processor obtains an image by using a lens into which a haze penetration optical component is not moved.

Step S202. The image signal processor determines whether a haze intensity of the image obtained in Step S201 is greater than a first threshold. If the haze intensity of the image obtained in Step S201 is greater than the first threshold, Step S203 is performed, or if the haze intensity of the image obtained in Step S201 is not greater than the first threshold, the procedure ends.

Step S203. The image signal processor sends control information about moving-in of the haze penetration optical component.

Step S204. A central processing unit moves the haze penetration optical component into the lens by using a driving component and based on the control information about moving-in of the haze penetration optical component.

After the haze penetration optical component is moved into the lens, the lens has a function of optical haze penetration. To be specific, the function of the optical haze penetration is enabled, and an image obtained by using the lens into which the optical component is moved, namely, an image obtained after the optical haze penetration. Further, digital haze penetration may be performed on the image obtained after the optical haze penetration. To be specific, FIG. 2 may further include the following steps.

Step S205. The image signal processor calculates a haze intensity of an image obtained by using the lens into which the haze penetration optical component is moved.

Figure 3:
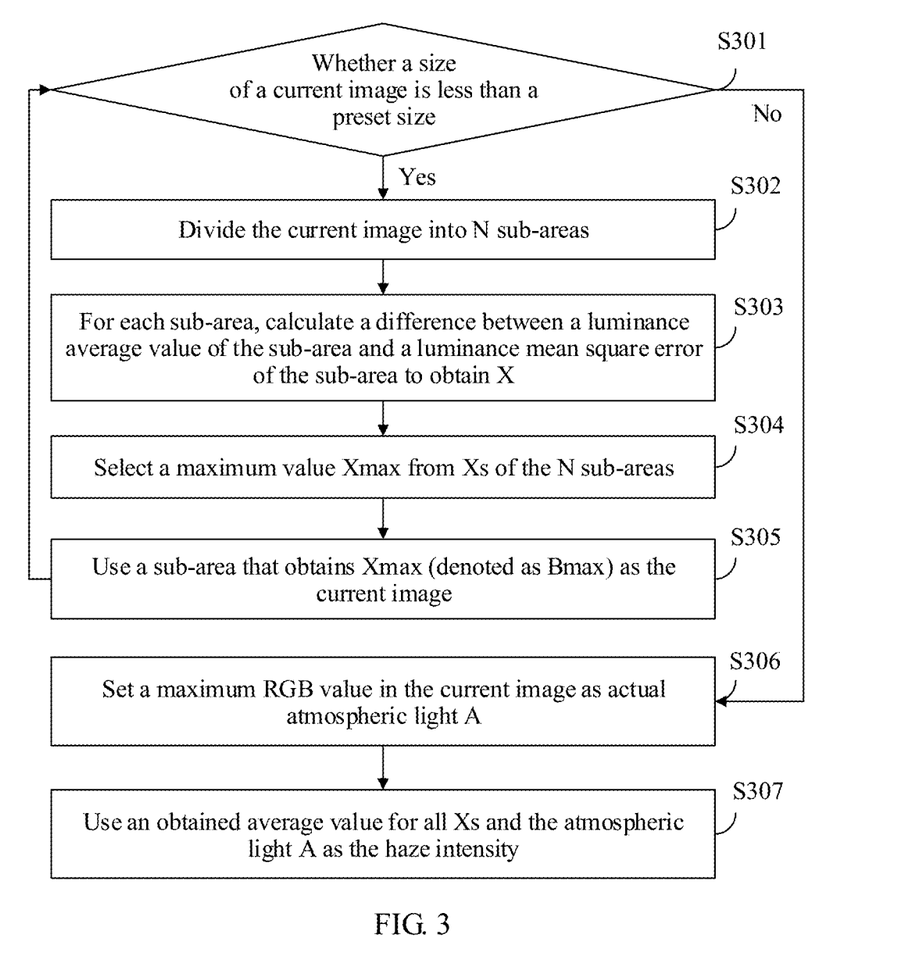
FIG. 3 is a flowchart of calculating a haze intensity of an image obtained after optical haze penetration according to an embodiment of this application.

Specifically, as shown in FIG. 3, a procedure of calculating the haze intensity of the image obtained after the optical haze penetration in Step S205 includes the following steps.

Step S301. Determine whether a size of a current image (when Step S301 is performed for the first time, the current image is an image obtained after optical haze penetration) is less than a preset size. If the size of the current image is less than the preset size, Step S302 is performed, or if the size of the current image is not less than the preset size, S306 is performed.

Step S302. Divide the current image into N sub-areas.

Step S303. For each sub-area, calculate a difference between a luminance average value of the sub-area and a luminance mean square error of the sub-area to obtain X.

Step S304. Select a maximum value Xmax from Xs of the N sub-areas.

Step S305. Use a sub-area that obtains Xmax (denoted as Bmax) as the current image, and return to perform S301.

Step S306. Set a maximum RGB value in the current image as actual atmospheric light A.

Step S307. Use a ratio of an obtained average value for all Xs to the actual atmospheric light A as the haze intensity of the image obtained after the optical haze penetration in S205.

Compared with a dark channel manner, the haze intensity of the image obtained after the optical haze penetration is calculated by using the procedure shown in FIG. 3, and this provides higher accuracy.

Step S206. The image signal processor determines whether the haze intensity calculated in Step S205 is greater than a second threshold. If the haze intensity calculated in Step S205 is greater than the second threshold, Step S207 is performed, or if the haze intensity calculated in Step S205 is not greater than the second threshold, the procedure ends.

Step S207. The image signal processor performs contrast enhancement processing on the image obtained by using the lens into which the haze penetration optical component is moved.

It can be learned from the procedure shown in FIG. 2 that, an image collection device shown in FIG. 1 may perform the optical haze penetration on the image. Optionally, when an effect of the optical haze penetration is poor, the digital haze penetration is further performed on the image obtained after the optical haze penetration.

Figure 4:
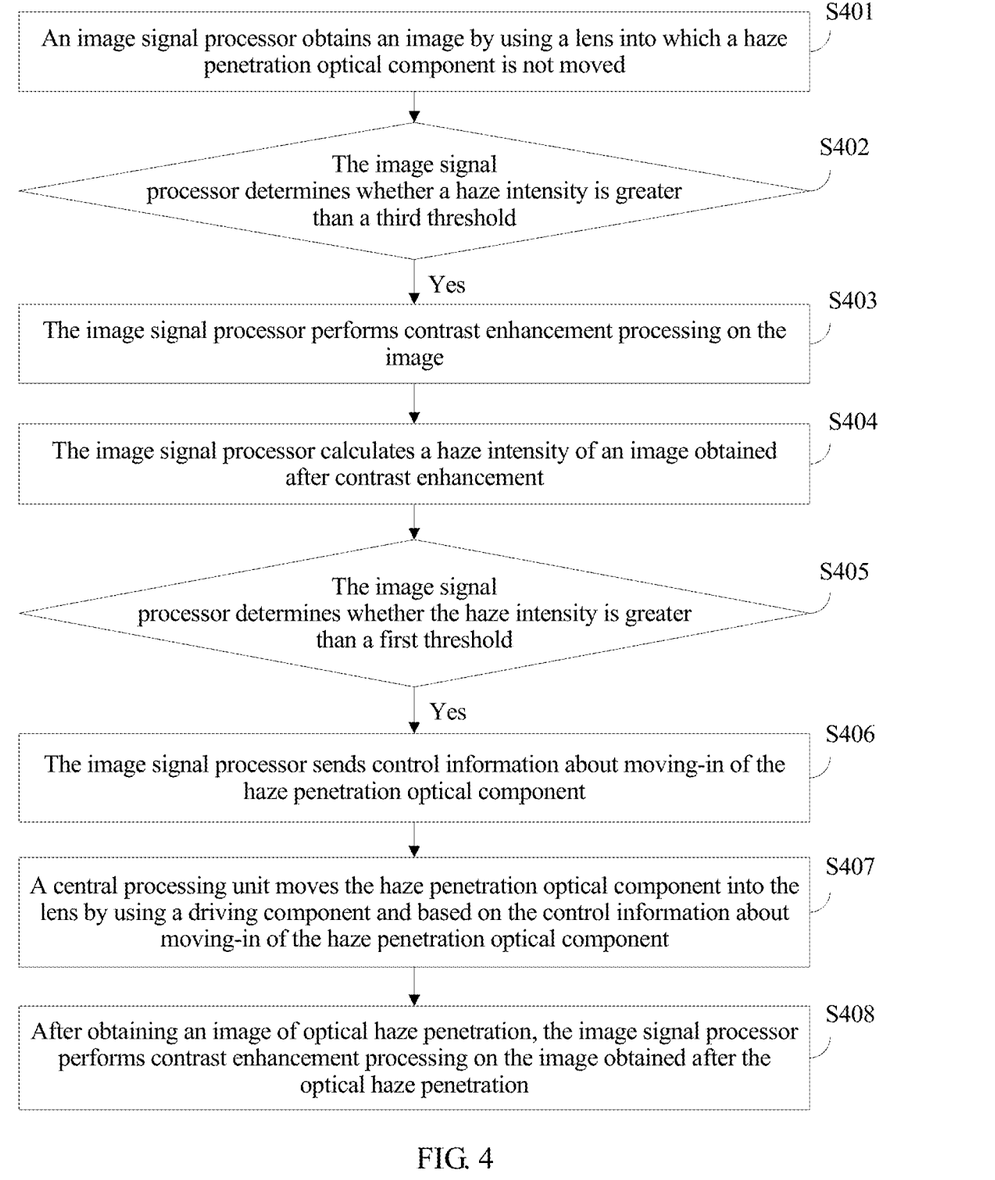
FIG. 4 is a flowchart of another image processing method according to an embodiment of this application.

Another procedure of performing haze penetration processing by an image collection device in FIG. 1 is shown in FIG. 4. A difference from a procedure shown in FIG. 2 is that, in FIG. 4, digital haze penetration is first performed on an image, and when an effect of the digital haze penetration is poor, optical haze penetration is enabled. FIG. 4 includes the following steps.

Step S401. An image signal processor obtains an image by using a lens into which a haze penetration optical component is not moved.

Step S402. The image signal processor determines whether a haze intensity of the image obtained in Step S401 is greater than a third threshold. If the haze intensity of the image obtained in Step S401 is greater than the third threshold, Step S403 is performed, or if the haze intensity of the image obtained in Step S401 is not greater than the third threshold, the procedure ends.

In this embodiment, an existing dark channel algorithm is used to calculate the haze intensity of the image, and details are not described herein.

Step S403. The image signal processor performs contrast enhancement processing on the image obtained in S401.

Step S404. The image signal processor calculates a haze intensity of an image obtained after contrast enhancement.

Step S405. The image signal processor determines whether the haze intensity of the image obtained in Step S404 is greater than a first threshold. If the haze intensity of the image obtained in Step S404 is greater than the first threshold, Step S406 is performed, or if the haze intensity of the image obtained in S404 is not greater than the first threshold, the procedure ends.

It should be noted that the first threshold in this embodiment may be different from a first threshold in the procedure shown in FIG. 2.

Step S406. The image signal processor sends control information about moving-in of the haze penetration optical component.

Step S407. A central processing unit moves the haze penetration optical component into the lens by using a driving component and based on the control information about moving-in of the haze penetration optical component, so as to enable optical haze penetration. An image is obtained by using the lens into which the haze penetration optical component is moved, namely, an image obtained after the optical haze penetration.

Step S408. After obtaining the image obtained after the optical haze penetration, the image signal processor performs contrast enhancement processing on the image obtained after the optical haze penetration, to obtain an image after the optical haze penetration and the digital haze penetration.

In the process shown in FIG. 4, the digital haze penetration is first performed on the image, and when the effect of the digital haze penetration is poor, the optical haze penetration is enabled. An objective is that if the digital haze penetration can cause the haze intensity of the image to meet a requirement, there is no need to enable the optical haze penetration. A haze penetration lens obtains only a greyscale image. Therefore, the digital haze penetration is first performed, and whether the optical haze penetration is enabled is determined based on the haze intensity of the image obtained after the digital haze penetration. This can ensure both quality and a color of the image.

Figure 5:
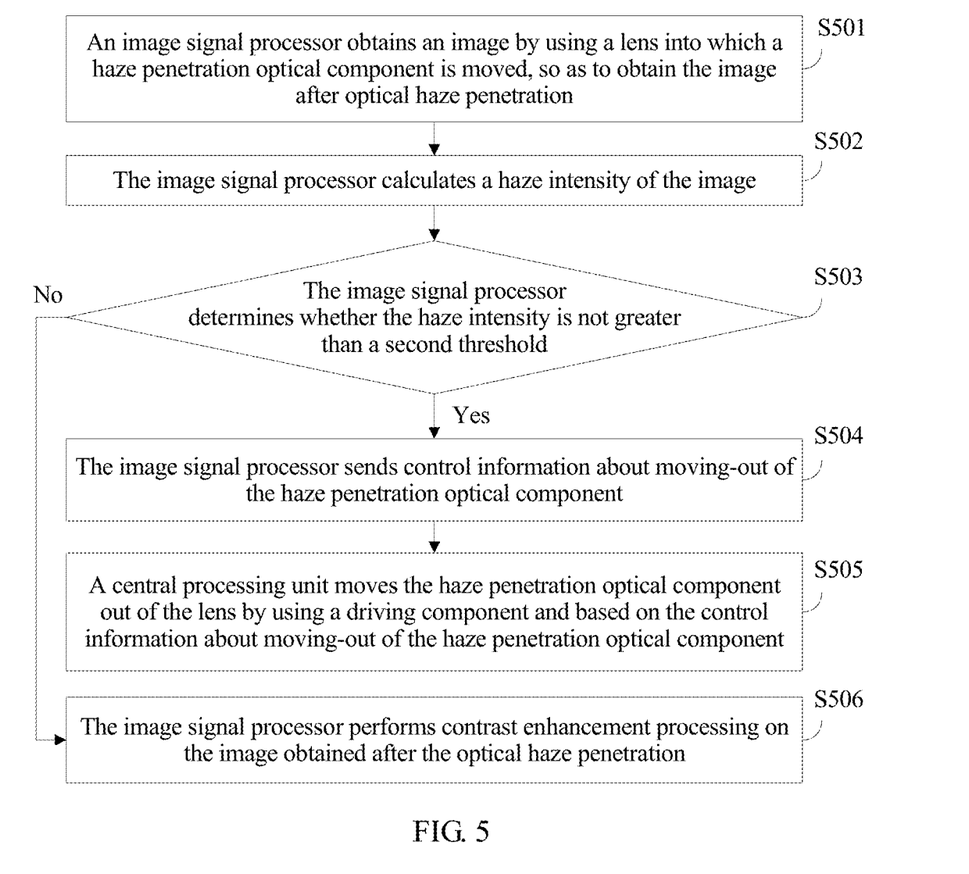
FIG. 5 is a flowchart of disabling optical haze penetration according to an embodiment of this application.

Procedures shown in FIG. 2 and FIG. 4 describe a process of enabling optical haze penetration. FIG. 5 describes a procedure of disabling the optical haze penetration when the optical haze penetration is enabled.

Step S501. An image signal processor obtains an image by using a lens into which a haze penetration optical component is moved, so as to obtain the image after optical haze penetration.

Step S502. The image signal processor calculates, by using the method shown in FIG. 3, a haze intensity of the image obtained in S501.

Step S503. The image signal processor determines whether the haze intensity is not greater than a second threshold. If the haze intensity is not greater than the second threshold, S504 is performed, or if the haze intensity is greater than the second threshold, Step S506 is performed.

Step S504. The image signal processor sends control information about moving-out of the haze penetration optical component.

Step S505. A central processing unit moves the haze penetration optical component out of the lens by using a driving component and based on the control information about moving-out of the haze penetration optical component, so as to disable optical haze penetration.

Step S506. The image signal processor performs contrast enhancement processing on the image obtained in Step S501.

Compared with the procedure shown in FIG. 2, in FIG. 5, when the haze intensity of the image obtained after the optical haze penetration is not greater than the second threshold, the optical haze penetration is disabled to maintain a color of the image.

It should be noted that in Step S503, when the haze intensity is greater than the second threshold, optical haze penetration is performed on the image obtained after the optical haze penetration in Step S506, and this is the same as a case in which the haze intensity calculated in Step S205 is greater than the second threshold in Step S206 in FIG. 2. In FIG. 2, when the haze intensity calculated in Step S205 is not greater than the second threshold in Step S206, the procedure ends. However, in FIG. 5, the haze penetration optical component is moved out of the lens, in other words, a function of the optical haze penetration is disabled. Therefore, Step S504 and Step S505 may be steps performed when the haze intensity calculated in Step S205 is not greater than the second threshold in Step S206.

It should be noted that, in FIG. 2 or FIG. 4, an initial state of a procedure is disabling optical haze penetration. To be specific, a first step of the procedure is that "an image signal processor obtains an image by using a lens into which a haze penetration optical component is not moved". In FIG. 5, an initial state of a procedure is enabling optical haze penetration. To be specific, a first step of the procedure is that "an image signal processor obtains an image by using a lens into which a haze penetration optical component is moved, so as to obtain the image after optical haze penetration". However, in an actual application, after power-on, an image collection device shown in FIG. 1 may be in a state of enabling or disabling the optical haze penetration, or may be in a state of enabling or disabling digital haze penetration. Therefore, in this embodiment of this application, a manner of setting a state machine is used, so that haze penetration procedures shown in FIG. 2, FIG. 4, and FIG. 5 adapt to a current haze penetration state (haze penetration is enabled or disabled) of the image collection device.

Specifically, in the image signal processor, the following types of state machines are preset: "performing no haze penetration solution", "digital haze penetration", and "digital haze penetration+optical haze penetration", and each type of state machine has a respective haze penetration processing procedure.

Performing no haze penetration solution means that haze penetration processing is not performed on the image.

Figure 6:
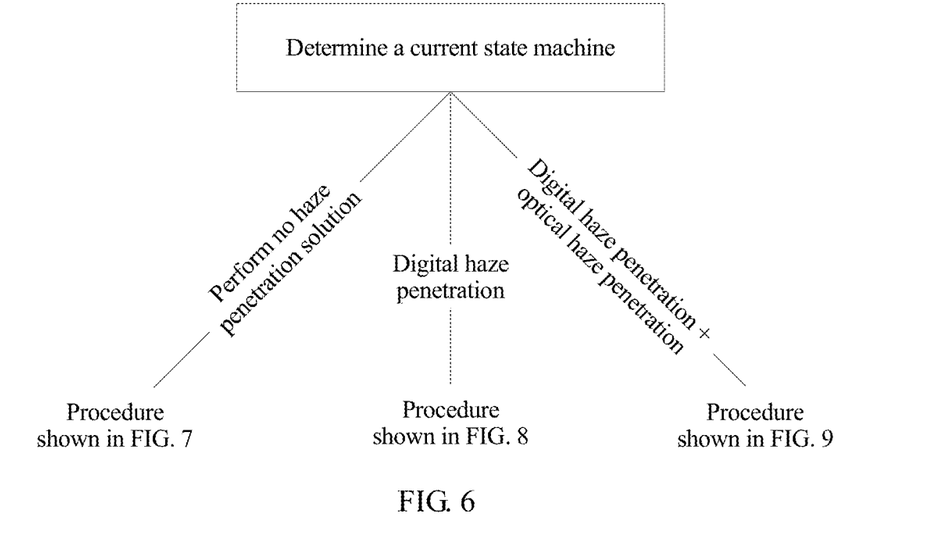
FIG. 6 is a flowchart of selecting image processing by a current state machine according to an embodiment of this application.

FIG. 6 shows a procedure of selecting image processing by an image signal processor shown in FIG. 1 based on a current state machine. The procedure includes the following steps.

Figure 7:
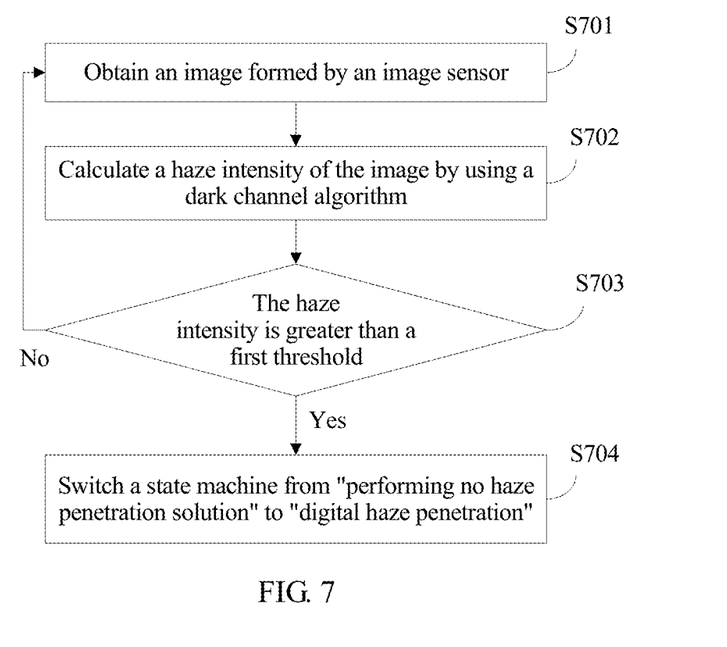
FIG. 7 is a processing flowchart when a state machine is in a state of "performing no haze penetration solution" according to an embodiment of this application.
Figure 8A:
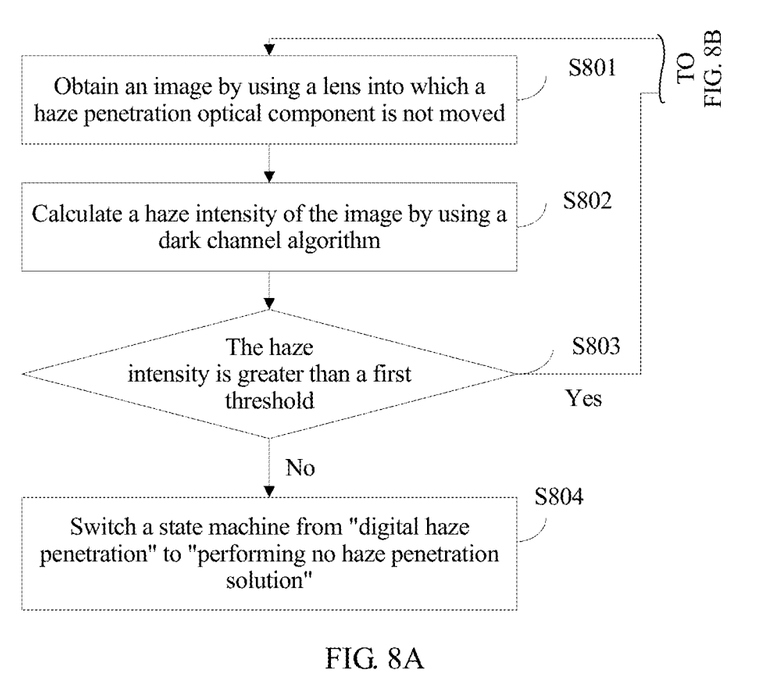
FIG. 8A and FIG. 8B are a processing flowchart when a state machine is in a state of "digital haze penetration" according to an embodiment of this application.
Figure 8B:
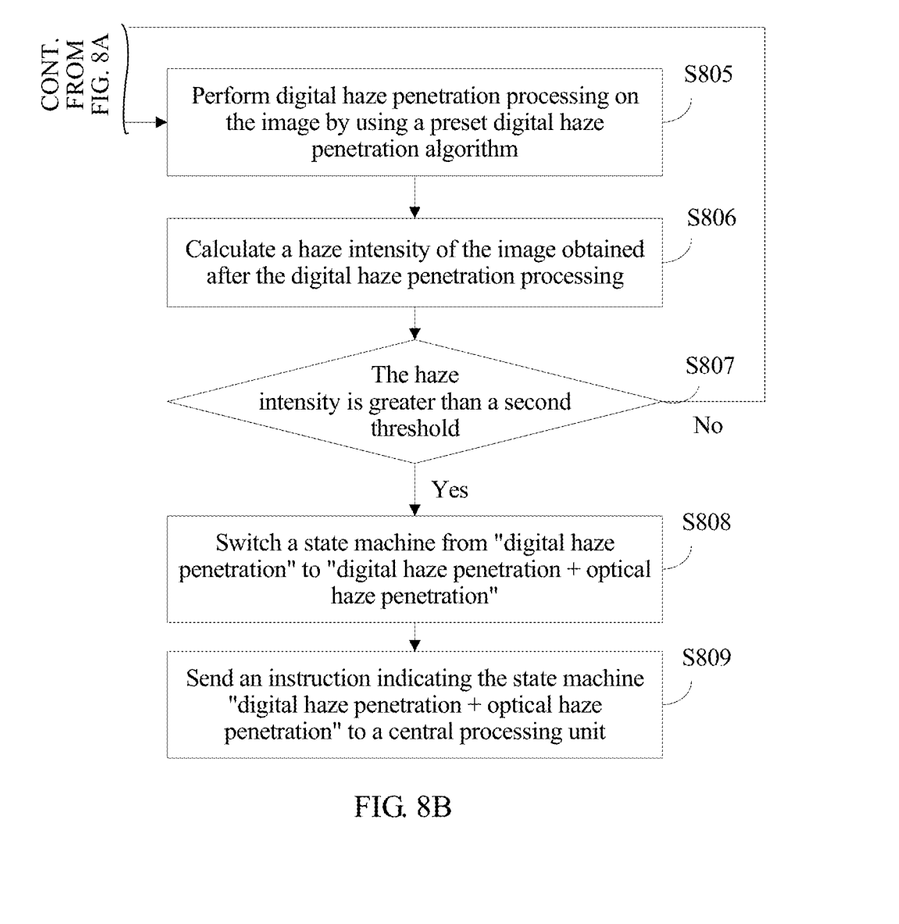
Figure 9:
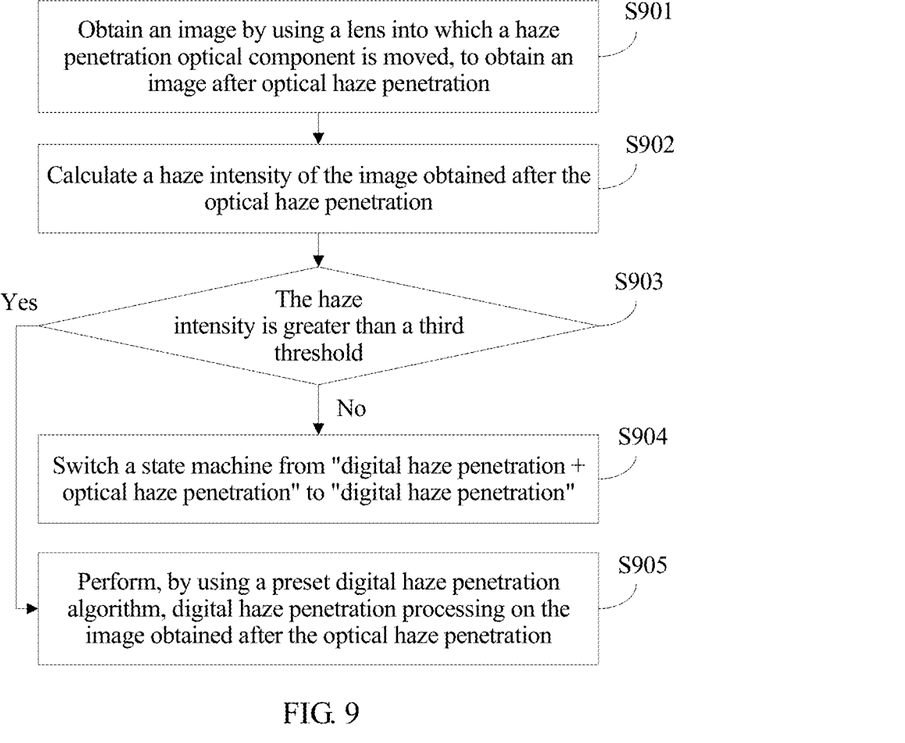
FIG. 9 is a processing flowchart when a state machine is in a state of "digital haze penetration+optical haze penetration" according to an embodiment of this application.
Figure 10:
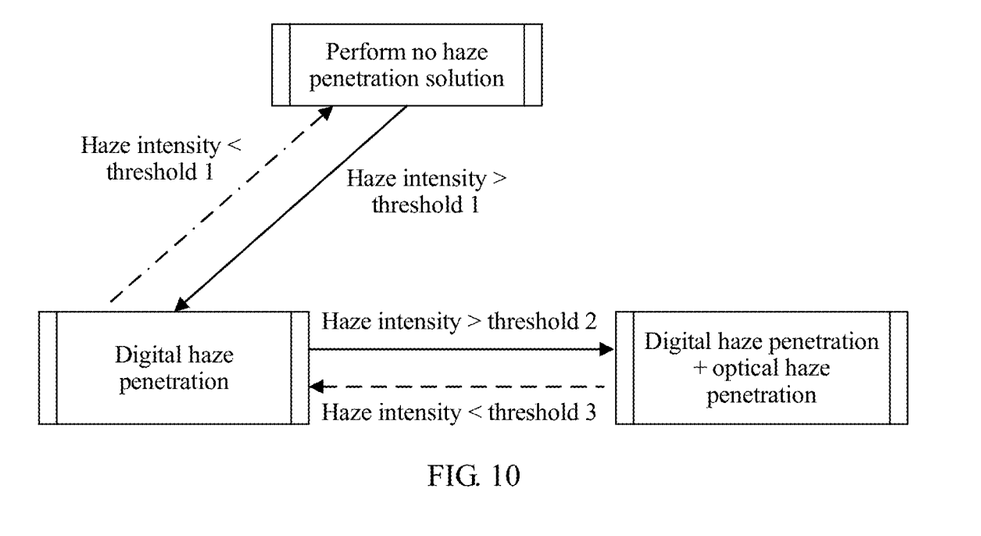
FIG. 10 is a schematic diagram of switching a state machine according to an embodiment of this application.

A current state machine is determined. If the current state machine is in a state of "performing no haze penetration solution", a procedure shown in FIG. 7 is started. If the current state machine is in a state of "digital haze penetration", a procedure shown in FIG. 8A and FIG. 8B is started. If the current state machine is in a state of "digital haze penetration+optical haze penetration", a procedure shown in FIG. 9 is started.

It should be noted that the procedure shown in FIG. 6 may occur after an image collection device shown in FIG. 1 is started. In other words, the procedure shown in FIG. 6 is applicable to a case in which the state machine before power-off is maintained after the image collection device is started. Certainly, the image collection device shown in FIG. 1 may also enter any of the foregoing state machines by default after start-up, and then perform a haze penetration procedure of the current state machine.

As shown in FIG. 7, when a state machine is in a state of "performing no haze penetration solution", a processing procedure of an image signal processor includes the following steps:

Step S701. Obtain an image by using a lens into which a haze penetration optical component is not moved.

Step S702. Calculate a haze intensity of the image by using a dark channel algorithm.

Step S703. Determine whether the haze intensity is greater than a first threshold. If the haze intensity is greater than the first threshold, Step S704 is performed, or if the haze intensity is not greater than the first threshold, the procedure shown in FIG. 7 is repeatedly performed, or the procedure ends.

Step S704. Switch a state machine from "performing no haze penetration solution" to "digital haze penetration".

As shown in FIG. 8A and FIG. 8B, when a state machine is in a state of "digital haze penetration", a processing procedure of an image signal processor includes the following steps.

Step S801. Obtain an image by using a lens into which a haze penetration optical component is not moved.

Step S802. Calculate a haze intensity of the image by using a dark channel algorithm.

Step S803. Determine whether the haze intensity is greater than a first threshold. If the haze intensity is not greater than the first threshold, Step S804 is performed, or if the haze intensity is greater than the first threshold, Step S805 is performed.

Step S804. Switch a state machine from "digital haze penetration" to "performing no haze penetration solution".

Step S805. Perform digital haze penetration processing on the image by using a preset digital haze penetration algorithm.

Specifically, digital haze penetration algorithms with a plurality of intensities may be preset, and a corresponding digital haze penetration algorithm is selected based on the haze intensity of the image. For example, in an image laboratory, a current corresponding haze intensity X may be calculated by using a dark channel haze penetration intensity prediction algorithm, and then an intensity Y of the digital haze penetration is manually adjusted, so that a current haze penetration effect is optimal. Data of a plurality of haze intensities and haze penetration intensities of the digital haze penetration is measured by repeating the foregoing sequence. A linear or nonlinear fitting tool (such as 1 stopt) is used to simulate and analyze the data and find a law between the haze intensity and the haze penetration intensity of the digital haze penetration. In this way, a relationship between the haze intensity and the intensity of the digital haze penetration may be determined by using a formula or through table lookup.

Step S806. Calculate a haze intensity of the image obtained after the digital haze penetration processing.

Step S807. Determine whether the haze intensity of the image obtained after the digital haze penetration processing is greater than a second threshold. If the haze intensity of the image obtained after the digital haze penetration processing is greater than the second threshold, Step S808 is performed, or if the haze intensity of the image obtained after the digital haze penetration processing is not greater than the second threshold, the procedure shown in FIG. 8A and FIG. 8B is repeatedly performed, or the processing procedure ends.

Step S808. Switch a state machine from "digital haze penetration" to "digital haze penetration+optical haze penetration".

Step S809. Send an instruction indicating the state machine "digital haze penetration+optical haze penetration" to a central processing unit.

It should be noted that, after receiving the instruction, the central processing unit controls a driving component to move a haze penetration lens or an optical filter into the lens.

It can be learned from FIG. 8A and FIG. 8B that functions performed in Step S801 to Step S803 and Step S805 to Step S809 are the same as functions performed in FIG. 4. The "first threshold" in FIG. 8A and FIG. 8B is equivalent to a "third threshold" in FIG. 4, and the "second threshold" is equivalent to a "first threshold" in FIG. 4.

As shown in FIG. 9, when a state machine is in a state of "digital haze penetration+optical haze penetration", a processing procedure of an image signal processor includes the following steps:

Step S901. Obtain an image by using a lens into which a haze penetration optical component is moved, to obtain an image after optical haze penetration.

Step S902. Calculate a haze intensity of the image obtained after the optical haze penetration. For a specific calculation method, refer to that shown in FIG. 3.

Step S903. Determine whether the haze intensity of the image obtained after the optical haze penetration is greater than a third threshold (equivalent to a second threshold in FIG. 2). If the haze intensity of the image obtained after the optical haze penetration is not greater than the third threshold, S904 is performed, or if the haze intensity of the image obtained after the optical haze penetration is greater than the third threshold, S905 is performed.

Step S904. Switch a state machine from "digital haze penetration+optical haze penetration" to "digital haze penetration", and send control information to a central processing unit (for example, an instruction indicating the state machine "digital haze penetration"), to control the haze penetration optical component to move out of the lens.

Step S905. Perform, by using a preset digital haze penetration algorithm, digital haze penetration processing on the image obtained after the optical haze penetration.

It can be learned that the procedure shown in FIG. 9 can perform functions shown in Step S205 to Step S207 and FIG. 5.

As shown in FIG. 10, FIG. 7 to FIG. 9 show switching of an image collection device between three state machines: "performing no haze penetration solution", "digital haze penetration", and "digital haze penetration+optical haze penetration". To be specific, the image collection device can switch between different haze penetration processing manners based on a relationship between a haze intensity of an image and a threshold (threshold).

It should be noted that FIG. 7 to FIG. 9 do not include a process of state machine switching from "performing no haze penetration solution" to "digital haze penetration+optical haze penetration" or "optical haze penetration", because optical haze penetration is implemented by using a haze penetration lens or an optical filter. Therefore, an image obtained after the optical haze penetration is not a color image. To be specific, a haze penetration effect is obtained by limiting a color of the image. Therefore, to ensure both the color of the image and the haze penetration effect, this embodiment of this application does not include the process of the state machine switching from the "performing no haze penetration solution" to the "digital haze penetration+optical haze penetration" or the "optical haze penetration".

Certainly, if only the haze penetration effect is considered, this embodiment of this application may include the process of the state machine switching from the "performing no haze penetration solution" to the "digital haze penetration+optical haze penetration" or the "optical haze penetration" (for example, the process shown in FIG. 2).

In the foregoing embodiments, a process of setting each threshold is as follows:

Determining a first threshold: in an image laboratory, haze of different intensities is simulated by using a haze simulation apparatus. When a haze penetration solution is mutually switched between "performing no haze penetration solution" and "digital haze penetration" and it is found that impact on a visual effect of a picture is slight, a haze intensity in this case may be temporarily set as the first threshold.

Determining a second threshold: in an image laboratory, haze of different intensities is simulated by using a haze simulation apparatus. When a haze penetration solution is switched from "digital haze penetration" to "digital haze penetration+optical haze penetration" and it is found that impact on a visual effect of a picture is slight, a haze intensity in this case may be temporarily set as the second threshold.

Determining a third threshold: in an image laboratory, haze of different intensities is simulated by using a haze simulation apparatus. When a haze penetration solution is switched from "digital haze penetration+optical haze penetration" to "digital haze penetration" and it is found that impact on a visual effect of a picture is slight, a haze intensity in this case may be temporarily set as the third threshold.

The foregoing determining processes are determined by naked eyes, and extremely strong subjectivity causes instability and unreliability of the determining processes. Therefore, randomness and an error rate can be reduced by simultaneous determining of a plurality of persons. In addition, the threshold is set based on a laboratory simulation environment, and the laboratory environment is different from a real haze weather environment. In a later stage, the threshold may be fine-tuned through a plurality of rounds of tests in an actual scenario.

What is claimed is:

1. An image processing method, comprising:
   calculating a haze intensity of a first image;
   when the calculated haze intensity of the first image is greater than a first threshold, moving a haze penetration optical component into a lens;

after moving the haze penetration optical component into the lens, obtaining a second image by using the lens;

determining a haze intensity of the second image based at least in part on atmospheric light of a plurality of sub-areas in the second image and actual atmospheric light; and when the determined haze intensity of the second image is greater than a second threshold, performing contrast enhancement processing on the second image, wherein the determined haze intensity of the second image is based on a ratio of an average value for atmospheric light of the plurality of sub-areas in the second image to actual atmospheric light.

2. The method of claim 1, wherein before calculating a haze intensity of the first image, the method further comprises:

obtaining a third image by using a lens into which the haze penetration optical component is not moved; and when a haze intensity of the third image is greater than a third threshold, obtaining the first image by performing contrast enhancement processing on the third image.

3. The method of claim 1, wherein the haze penetration optical component comprises:

a haze penetration lens or an optical filter.

4. An image processing method, comprising:

calculating a haze intensity of an image based on a ratio of an average value for atmospheric light of a plurality of sub-areas in the image to actual atmospheric light, wherein the image is obtained by a lens having a haze penetrating optical component; and when the calculated haze intensity of the image is not greater than a threshold, moving the haze penetration optical component out of the lens, and using a second lens that the haze penetration optical component is not moved out of to obtain the image.

5. The method of claim 4, further comprising:

when the haze intensity of the image is greater than the threshold, performing contrast enhancement processing on the image.

6. The method of claim 4, wherein the haze penetration optical component comprises:

a haze penetration lens or an optical filter.

7. An image collection device, comprising:

a lens;

an image sensor coupled to the lens and configured to capture images;

a haze penetration optical component;

a drive component coupled to the haze penetration optical component;

an image signal processor configured to:

calculate a haze intensity of a first image captured by the image sensor, and when the calculated haze intensity of the first image is greater than a first threshold, generate control information;

a central processing unit coupled to the image signal processor and the drive component and configured to:

receive the control information, and control, based on the control information, the driving component to move the haze penetration optical component into the lens; and wherein the image signal processor is further configured to:

after the haze penetration optical component is moved into the lens, determine a haze intensity of a second image captured by the image sensor based at least in part on atmospheric light of a plurality of sub-areas in the second image and actual atmospheric light, and when the determined haze intensity of the second image is greater than a second threshold, perform contrast enhancement processing on the second image, wherein the image signal processor is further configured to determine the haze intensity of the second image based on a ratio of an average value for atmospheric light of the plurality of sub-areas in the second image to actual atmospheric light.

8. The device of claim 7, wherein the image signal processor is further configured to:

before calculating the haze intensity of the first image, determine a haze intensity of a third image captured by the image sensor by using a lens into which the haze penetration optical component is not moved; and when the determined haze intensity of the third image is greater than a third threshold, obtain the first image by performing contrast enhancement processing on the third image.

9. The device according to claim 7, wherein the haze penetration optical component comprises:

a haze penetration lens or an optical filter.

* * * * *